United States Patent
Honda et al.

(10) Patent No.: US 8,564,907 B2
(45) Date of Patent: Oct. 22, 2013

(54) POSITION DETERMINING MEMBER TO ALIGN A MAGNETIC TAPE CARTRIDGE IN A MAGNETIC RECORDING AND REPRODUCING APPARATUS

(75) Inventors: Hidetoshi Honda, Miyagi (JP); Takaaki Sanpei, Miyagi (JP); Shuichi Kikuchi, Miyagi (JP); Yasuaki Kano, Kanagawa (JP); Fumiharu Sudo, Tokyo (JP); Katsumi Maekawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1055 days.

(21) Appl. No.: 12/112,830

(22) Filed: Apr. 30, 2008

(65) Prior Publication Data
US 2008/0273259 A1 Nov. 6, 2008

(30) Foreign Application Priority Data
May 1, 2007 (JP) .................................. 2007-120636

(51) Int. Cl.
*G11B 23/087* (2006.01)
*G11B 15/30* (2006.01)

(52) U.S. Cl.
USPC ..................... 360/132; 242/345.2; 360/96.1

(58) Field of Classification Search
USPC .............. 360/132, 96.1–96.4; 242/345, 345.2
See application file for complete search history.

(56) References Cited

U.S. PATENT DOCUMENTS

| | | | | |
|---|---|---|---|---|
| 3,869,099 A | * | 3/1975 | Inaga | 360/93 |
| 4,309,002 A | * | 1/1982 | Saitou et al. | 242/345.2 |
| 4,436,256 A | * | 3/1984 | Saitou | 242/345.2 |
| 5,034,843 A | * | 7/1991 | Toral et al. | 360/132 |
| 5,409,174 A | * | 4/1995 | Doninelli | 360/132 |
| 5,433,397 A | * | 7/1995 | Lalouette et al. | 242/342 |
| 5,447,278 A | * | 9/1995 | Lalouette et al. | 360/132 |
| 6,568,619 B1 | * | 5/2003 | Shiga et al. | 360/132 |
| 2005/0158491 A1 | * | 7/2005 | Iino | 428/34.1 |
| 2008/0029632 A1 | * | 2/2008 | Inugai et al. | 242/340 |

FOREIGN PATENT DOCUMENTS

| | | |
|---|---|---|
| JP | 58-12115 | 1/1983 |
| JP | 58-012178 | 1/1983 |
| JP | 04-332983 | 11/1992 |
| JP | 2000-76822 | 3/2000 |
| JP | 2005-243167 | 9/2005 |
| JP | 2005-293691 | 10/2005 |
| JP | 2006-107542 | 4/2006 |

* cited by examiner

*Primary Examiner* — Craig A. Renner
(74) *Attorney, Agent, or Firm* — K&L Gates LLP

(57) ABSTRACT

A magnetic tape cartridge includes a cartridge case, a pair of cylindrical hubs rotatably provided in the cartridge case, and a magnetic tape laid between the hubs and wound around outer peripheries of the hubs. Each of the hubs has an inner diameter portion provided with a height-position determining member. The height-position determining member determines a height position of the hub in the magnetic tape cartridge by contacting a driving shaft inserted in the hub when the magnetic tape cartridge is mounted in a magnetic recording and reproducing apparatus.

8 Claims, 12 Drawing Sheets

POSITION DETERMINING MEMBER TO ALIGN A MAGNETIC TAPE CARTRIDGE IN A MAGNETIC RECORDING AND REPRODUCING APPARATUS

CROSS REFERENCES TO RELATED APPLICATIONS

The present application claims priority to Japanese Patent Application JP 2007-120636 filed in the Japanese Patent Office on May 1, 2007, the entire contents of which are incorporated herein by reference.

BACKGROUND

The present application relates to a magnetic tape cartridge and a magnetic recording and reproducing apparatus used to record digital data. More particularly, the present application relates to a structure of a hub in a magnetic tape cartridge and a structure of a hub driving portion in a magnetic recording and reproducing apparatus that define the height position of the hub.

Among streamers used as external storage apparatuses for computers, so-called scan-type streamers which include a rotary drum and a tape loading mechanism and utilize a magnetic tape cartridge, similarly to video tape recorders, are commercially available. In the so-called low-end market, formats, such as DDS and DAT 72, are widespread, and there is a demand to increase the storage capacity. In order to meet this demand, manufacturers have made improvements in streamers.

For example, one method for increasing the storage capacity is disclosed in Japanese Unexamined Patent Application Publication No. 2006-107542. In this method, it is possible to use a new magnetic tape cartridge that contains a magnetic tape having a tape width larger than the width of magnetic tapes in current magnetic tape cartridges.

Unfortunately, increasing the tape width involves making substantial changes to the mechanism in the magnetic recording apparatus. Therefore, it is not practical, as a measure to achieve a larger storage capacity, to increase the tape width in accordance with the format generation.

Accordingly, the storage capacity may be increased by increasing the track density, as in the related art, or by shortening the recording wavelength so as to increase the volume of data to be recorded in one track in helical scanning.

Considering that streamers of at least the previous generation are still used and that many magnetic tape cartridges of the previous generation in which information was recorded by the previous streamers remain, it is desirable to ensure that new types of streamers capable of using new magnetic tape cartridges with a higher recording density are compatible with magnetic tape cartridges of the previous generation, are able to use magnetic tape cartridges of at least the previous generation, and can normally reproduce data recorded in the magnetic tape cartridges by streamers of the previous generation.

In a so-called DDS- or DAT-format tape streamer, if the track density is increased to realize a larger storage capacity, a hub around which a tape is wound is free to move in the height direction (up-down direction), and therefore, vibration in the height direction of the hub is caused by running of the tape. Due to this vibration, the height of the running tape changes, and the height position where the tape slides on a rotary drum having a recording and reproducing head changes. Consequently, it is difficult to precisely trace a track pattern.

SUMMARY

It is desirable to provide a magnetic tape cartridge that achieves high-density recording and reproduction by determining the position of a hub in the height direction and regulating the movement of the hub in the height direction during running of a magnetic tape, and to provide a magnetic recording and reproducing apparatus in which the magnetic tape cartridge is to be mounted.

A magnetic tape cartridge according to an embodiment includes a cartridge case; a pair of cylindrical hubs rotatably provided in the cartridge case; and a magnetic tape laid between the hubs and wound around outer peripheries of the hubs. Each of the hubs has an inner diameter portion provided with a height-position determining member. The height-position determining member determines a height position of the hub in the magnetic tape cartridge by contacting a driving shaft inserted in the hub when the magnetic tape cartridge is mounted in a magnetic recording and reproducing apparatus.

Preferably, the height-position determining member is formed by a magnetic member or includes a magnetic member.

The magnetic tape cartridge may further include an elastic member configured to contact the height-position determining member so as to press the hub toward the driving shaft.

Preferably, a position where the height-position determining member contacts the driving shaft corresponds to or is higher than a widthwise center of the magnetic tape wound around the hub.

A magnetic recording and reproducing apparatus according to another embodiment includes one rotating drum device having a rotating head; and a pair of driving shafts rotatably supported at one end. The magnetic tape cartridge according to the embodiment is mounted in the magnetic recording and reproducing apparatus. At least one of the driving shafts has a magnet in a portion in contact with the height-position determining member in the magnetic tape cartridge.

When the magnetic tape cartridge according to an embodiment is mounted in the magnetic recording and reproducing apparatus, the height-position determining member contacts the driving shaft so that the hub is placed in a proper height position in the magnetic tape cartridge. This can optimize the height position of the magnetic tape during running. Further, by utilizing the magnetic force and the elastic force of the elastic member, the height position of the hub can be stably held and the height position of the magnetic tape in contact with the rotating head of the magnetic recording and reproducing apparatus during tape running can be stabilized. Moreover, unlike the related art, both a tape cartridge having no height-position determining member and a cartridge having a height-position determining member can be used. Consequently, a larger-capacity cartridge can be used in a tape streamer that performs recording with higher density.

Additional features and advantages are described herein, and will be apparent from the following Detailed Description and the figures.

DETAILED DESCRIPTION

Figure 1:
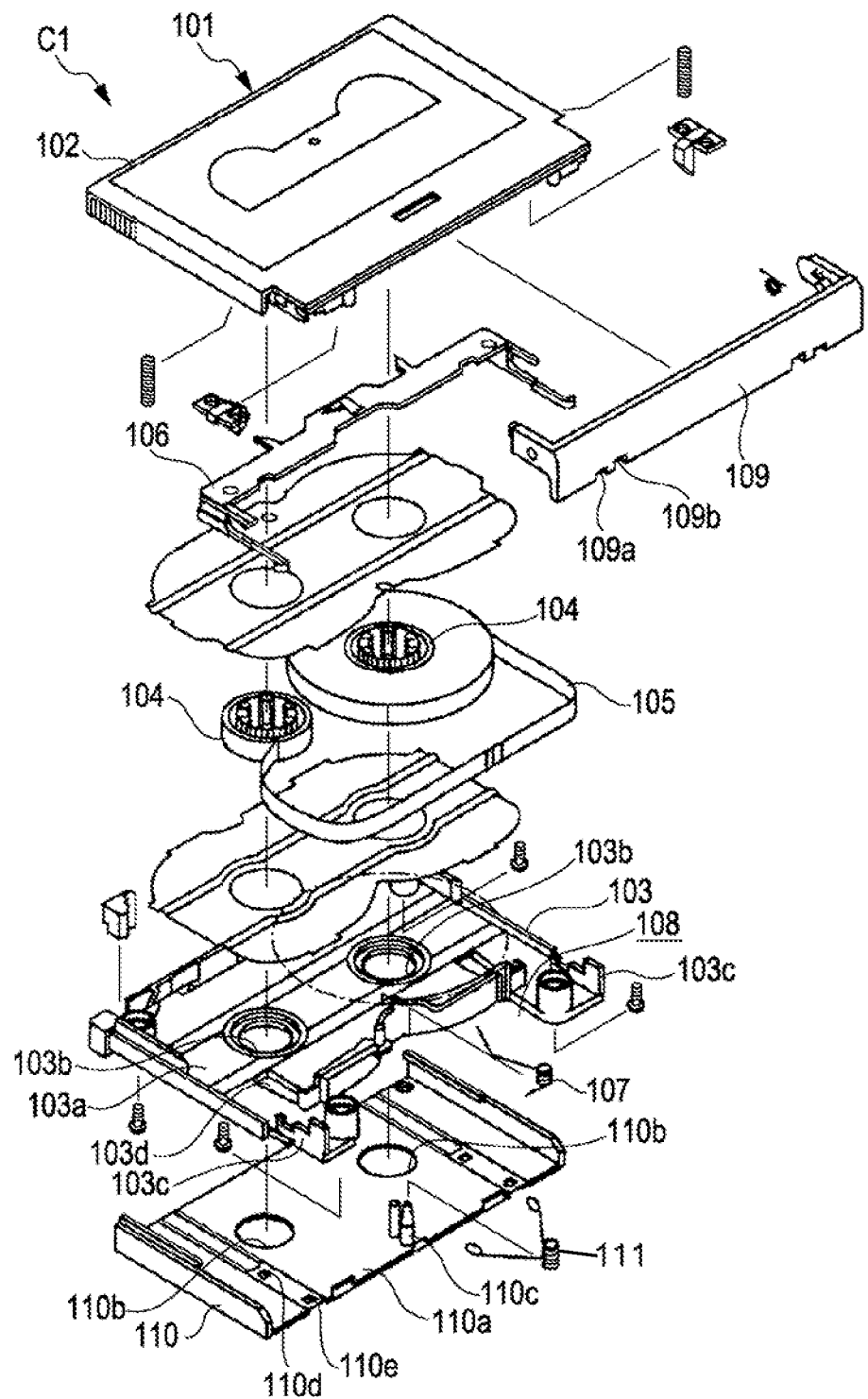
FIG. 1 is an exploded view showing the configuration of a magnetic tape cartridge according to an embodiment.

For example, Japanese Unexamined Patent Application Publication No. 58-12115 discusses an idea that positioning in the height direction is performed with a magnet so as to maintain a proper height position even if the attitude changes. However, originally, the height position of a reel or hub can be effectively determined by using a reel or hub base, and therefore, can be determined by simply using a lower surface of the reel or hub. For this reason, consideration is not taken of the use of both a magnetic tape cartridge (also simply referred to as a cartridge) that is not provided with a height regulating mechanism (a mechanism for determining the position of the reel or hub in the height direction and regulating displacement from the position in the height direction) and a cartridge provided with a height regulating mechanism.

While so-called linear recording is adopted in the technique disclosed in the above-described publication, the application is directed to a format in which the track width is about 0.61 mm and a sufficient mechanical margin is provided. Further, since the problem can be substantially solved by preventing the movement of the cartridge itself, this technique has not been commonly used.

In recent years, an LTO-format magnetic tape cartridge having one reel or one hub has been used, as specified in the open standard ECMA-319 (European Computer Manufacturers Association). In this magnetic tape cartridge, a magnetic member is provided on a lower surface of the reel or hub. In a state in which the reel or hub having the magnetic member is magnetically attracted by a magnet provided in a driving shaft, a gear of the reel or hub is engaged with a gear of the driving shaft so as to drive the reel or hub.

This cartridge has a structure disclosed in, for example, Japanese Unexamined Patent Application Publication No. 2000-76822. The cartridge adopts a chucking mechanism mainly in order to attract the reel or hub over a wide area. The cartridge also includes a reel spring, and prevents the entry of dust through the clearance of the rotating reel or hub while the cartridge is not mounted, by using a gear outer edge of the chucking mechanism. For this reason, the format of this cartridge is also originally designed on the assumption that the height position of the reel or hub is determined by using the lower surface of a flange of the reel or the lower surface of the hub, and that displacement from the height position in the height position is regulated. Therefore, consideration is not taken of compatible mounting of a cartridge having a height regulating mechanism and a cartridge having no height regulating mechanism.

Similarly to the above-described LTO-format cartridge in which the height position is regulated with the lower surface of the flange of the reel or the lower surface of the hub by using the reel spring mechanism, an IT-1-format cartridge serving as an 8-mm data cartridge is originally designed on the assumption that the height position of a reel or hub is regulated, and the height position is determined by using the lower surface of a flange of the reel or the lower surface of the hub, for example, as specified in the standard ECMA-291. Therefore, in this case, consideration is also not taken of compatible mounting of a cartridge having a height regulating mechanism and a cartridge having no height regulating mechanism.

Japanese Unexamined Patent Application Publication No. 2005-293691 discloses a cartridge having two reels, such as an AIT-format cartridge, in which an attitude holding mechanism having a magnet or the like is provided. This cartridge also includes a height-position determining portion on the lower surface of the reel, similarly to the cartridge disclosed in the above-described publication 2000-76822.

In this way, the magnetic tape cartridges, as in the related art, are generally provided with the height-position determining mechanism using the lower surface of the reel or hub. For this reason, height regulation is frequently difficult unless the portion for determining the height of the reel or hub is larger than the driving shaft. Even when the size of the portion for determining the height of the reel or hub is not limited by the relationship with the driving shaft, the reel or hub can be more stably supported by being received on a wider surface, and therefore, the lower surface of the reel or hub is used. In this way, in the related art, the size of the portion for determining the height of the reel of hub may be larger than the diameter of the driving shaft. Further, there is no mention of the height being regulated by using the driving shaft inserted in the inner diameter portion of the hub, as in the present application.

In order to use both a cartridge having a height-position determining mechanism and a cartridge having no height-position determining mechanism, such as the above-described DDS- and DAT-format cartridges, it is important to consider compatibility of the cartridge having a height-position determining member with the cartridge having no height-position determining mechanism when developing a magnetic-tape cartridge and a magnetic recording and reproducing apparatus. In this case, there are problems, that is, the driving shaft should be inserted into the hub around which the tape is wound, and the above-described portion for determining the height position is not provided on the lower surface of the hub in existing cartridges that are formed without consideration of determination of the height position of the hub.

Accordingly, in order to compatibly mount a cartridge (existing cartridge) using a DDS or DAT data format and having no height-position determining portion and a cartridge (developed cartridge) having a height-position determining portion, the present inventors considered that the height position should be determined inside an inner diameter portion of the hub. That is, it is desirable that a height-position determining portion have a size smaller than the inner diameter of a hub around which a tape is wound, that a driving shaft be fitted in an inner diameter portion of the hub, and the height-position determining portion be in contact with an upper end portion (top portion) of the driving shaft in order to support the hub.

In order to solve the above-described problems, the present inventors focused on the relationship between a hub of a magnetic-tape cartridge and a hub driving shaft of a magnetic recording and reproducing apparatus, and achieved the present application as a result of earnest examinations. The configurations of a magnetic-tape cartridge and a magnetic recording and reproducing apparatus according to an embodiment will be described below with reference to the drawings.

A magnetic-tape cartridge according to an embodiment includes a cartridge case, a pair of cylindrical hubs rotatably provided in the cartridge case, and a magnetic tape laid between the hubs and wound around outer peripheries of the hubs. An inner diameter portion of each of the hubs includes a height-position determining member that contacts a driving shaft of a magnetic recording and reproducing apparatus at a predetermined height when the driving shaft is inserted in the inner diameter portion. Preferably, the height-position determining member is formed of a magnetic material or contains a magnetic material. Alternatively, the magnetic-tape cartridge includes an elastic member that presses the hub toward the driving shaft by contact with the height-position determining member. Preferably, a position where the height-position determining member contacts the driving shaft is equal to a height position corresponding to the widthwise center of a magnetic tape wound around the hub or is higher than the height position.

Figure 2:
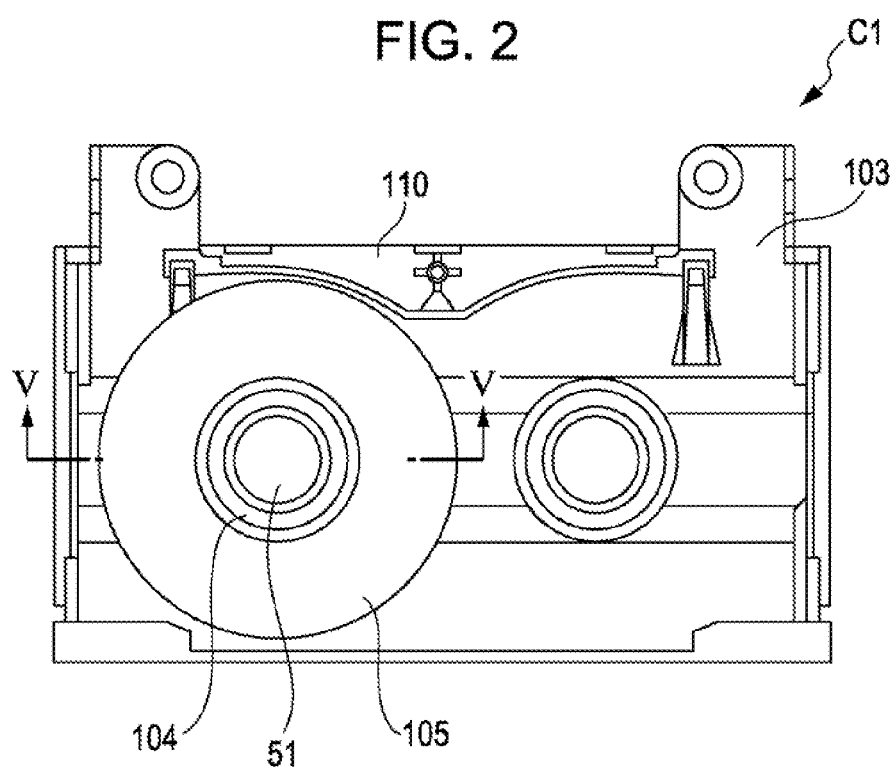
FIG. 2 is a top view showing the configuration of the magnetic tape cartridge.

FIGS. 1 and 2 show the configuration of a magnetic tape cartridge according to the embodiment. FIGS. 1 and 2 are an exploded view and a top view, respectively, of the magnetic tape cartridge.

A tape cartridge C1 according to the embodiment includes an upper shell 102 and a lower shell 103 that are combined into a cartridge case 101. In the cartridge case 101, a magnetic tape 105 wound around a pair of hubs 104 is stored.

The hubs 104 are rotatably provided in the cartridge case 101, and each have a rib projecting in the radial direction from the entire inner periphery thereof so as to form a chucking gear. This chucking gear is engaged with a gear provided in an upper part of the outer periphery of a driving shaft in a magnetic recording and reproducing apparatus so that the rotating force of the driving shaft is transmitted to the hub 104. Each hub 104 also has a height-position determining member 51 fixed to a predetermined position in an inner diameter portion of the hub 104 at a predetermined height in a manner such as to partition the inner diameter portion (FIG. 2). When the tape cartridge C1 is mounted in the magnetic recording and reproducing apparatus, the height-position determining member 51 contacts a top portion of the driving shaft inserted in the hub 104, thereby determining the height position of the hub 104 in the tape cartridge C1.

The height-position determining member 51 is formed by a magnetic member that is attracted by the magnetic force of a magnet provided in the driving shaft, or includes the magnetic member. In this case, it is satisfactory as long as the magnetic member is formed of any magnetic material that is attracted by the magnetic force of the magnet in the driving shaft. For example, the magnetic member may be formed of ferritic stainless steel or formed by a magnet such as a permanent magnet. While any of the height-position determining members 51 of the hubs 104 may have a magnetic member, a magnetic member is provided in at least one of the height-position determining members 51 of the hubs 104 in which the driving shaft having a magnet is inserted when the tape cartridge C1 is mounted in the magnetic recording and reproducing apparatus that will be described below.

Preferably, the height-position determining member 51 is fixed to the inner diameter portion of the hub 104, for example, at a height of −15% or more of the width of the magnetic tape 105 when the direction in which the driving shaft is inserted deep with respect to the widthwise center of the magnetic tape 105 is the (+)-direction and the direction in which the driving shaft is inserted shallowly is (−)-direction. Further, considering the tolerance (variation) of engagement between the chucking gear of the hub 104 and the gear at the top of the driving shaft, it is preferable to hold the height-position determining member 51 to the inner diameter portion of the hub 104 at the widthwise center of the magnetic tape 105 or at a position above the widthwise center (position where the driving shaft is inserted more deeply) (0 to 40%).

The height-position determining member 51 for determining the height position of the hub 104 can be fixed by insert-molding the hub 104 in a state in which a magnetic member (for example, a plate of ferritic stainless steel such as SUS 403) or by fixing a magnetic member to the inner diameter portion of the hub 104 with a plurality of components.

The above-described structure allows the magnetic tape 105 to contact a rotating head in the magnetic recording and reproducing apparatus at a proper height position. Wobbling due to the fitting clearance is prevented even in a state in which the driving shaft is fitted in the inner diameter portion of the hub 104, and a magnet, such as a ferrite magnet, is held near the upper end of the driving shaft. Therefore, the height position of the hub 104 can be stably retained by attraction of the magnetic member to the magnet, and the height position where the magnetic tape contacts the rotating head of the magnetic recording and reproducing apparatus during running of the tape can be stabilized. Moreover, unlike the related arts, it is possible to use both a cartridge having no height-position determining member and a cartridge having a height-position determining member.

The height position of the hub may be held by pressing an elastic member, such as a spring, provided in the cartridge against the portion for determining the height position from the upper side of the cartridge. Alternatively, the height can be regulated during tape running by more stably holding the hub through a combination use of the method using the magnet and the method using the elastic member.

Referring to FIG. 1, a hub lock 106 is provided in the lower shell 103. The hub lock 106 prohibits the rotation of the hub 104 so that the magnetic tape 105 is not loosened by the rotation of the hub 104 in a non-use state of the tape cartridge C1. The hub lock 106 is biased by a hub lock spring 107 and is engaged with the gear portions provided in the hubs 104. Further, a lid 109 provided in the upper shell 102 protects the magnetic tape 105 stretched in a tape loading space (mouth portion) 108 provided at the front of the cartridge case 101 in the non-use state of the tape cartridge C1.

Shaft insertion holes 103b are provided in a substantially rectangular bottom face 103a of the lower shell 103. The shaft insertion holes 103b allow the driving shafts of the magnetic recording and reproducing apparatus to be inserted in the cartridge case 101 therethrough when the tape cartridge C1 is used. Right and left ends of the bottom face 103a form projecting portions 103c extending forward. The tape loading space 108 is provided between the right and left projecting portions 103c.

A slider 110 is in contact with the bottom face 103a of the lower shell 103 from below, and slides in the front-rear direction of the tape cartridge C1. When the slider 110 is placed on the front side, the space 108 and the shaft insertion holes 103b in the lower shell 103 are closed by a bottom face 110a of the slider 110 for the purpose of dust prevention. When the slider 110 is placed on the rear side, the space 108 of the lower shell 103 is opened and two holes 110b provided in the bottom face 110a of the slider 110 are aligned with the shaft insertion holes 103b of the lower shell 103.

A slider lock spring 111 is fitted on a cylindrical rib 110c provided at the front of the bottom face 110a of the slider 110. In a non-use state of the tape cartridge C1, the slider 110 is biased by the slider lock spring 111 so as to be placed on the front side of the cartridge C1. Slider locks 103d are provided integrally with right and left portions of the bottom face 103a of the lower shell 103, and are fitted in right and left pairs of positioning holes 110d and 110e provided in the bottom face 110a of the slider 110, thus determining the front and rear positions of the slider 110.

When the tape cartridge C1 is mounted in the magnetic recording and reproducing apparatus, a pair of slider unlock ribs standing on a bottom face of a cassette holder, which forms a cartridge inserting portion of the magnetic recording and reproducing apparatus, pass through a pair of first cutouts 109a provided at the lower front edge of the lid 109, and unfasten the lock by the slider locks 103d fitted in the positioning holes 110d of the slider 110. A pair of slider opening projections standing on the bottom face of the cassette holder pass through a pair of second cutouts 109b provided at the lower front edge of the lid 109, contact a front face of the slider 110, and push the slider 110 toward the rear of the tape cartridge C1.

The pushed slider 110 is placed in the rear position of the tape cartridge C1 by engagement between the slider locks 103d and the positioning holes 110e. Subsequently, the lid 109 is pivoted to open the space 108, regulation of rotation of the hubs 104 by the hub lock 106 is eliminated, and the magnetic tape 105 is made ready for loading.

While the magnetic tape 105 is wound around the hubs, is may be wound around reels in each of which a flange is provided on a hub.

The magnetic recording and reproducing apparatus according to the embodiment includes one rotating drum device having a rotating head, and a pair of driving shafts rotatably supported at one end. At least one of top portions of other ends of the driving shafts is provided with a magnet. In the magnetic recording and reproducing apparatus, both a magnetic tape cartridge having no member for determining the height position of the hub and the magnetic tape cartridge C1 having the member 51 for determining the height position of the hub can be loaded normally. The magnetic tape cartridge having no height-position determining member is held in a manner similar to that adopted in the related arts. When the magnetic tape cartridge having the height-position determining member is loaded, the top portion of the driving shaft contacts the height-position determining member so as to hold the hub at a proper height position, and the driving shaft regulates displacement of the hub in the height direction by using the attraction force between the magnet of the driving shaft and the magnetic member in the hub.

A description will now be given of a state in which the magnetic tape cartridge C1 is mounted in the magnetic recording and reproducing apparatus (a streamer 10) according to the embodiment.

Figure 3:
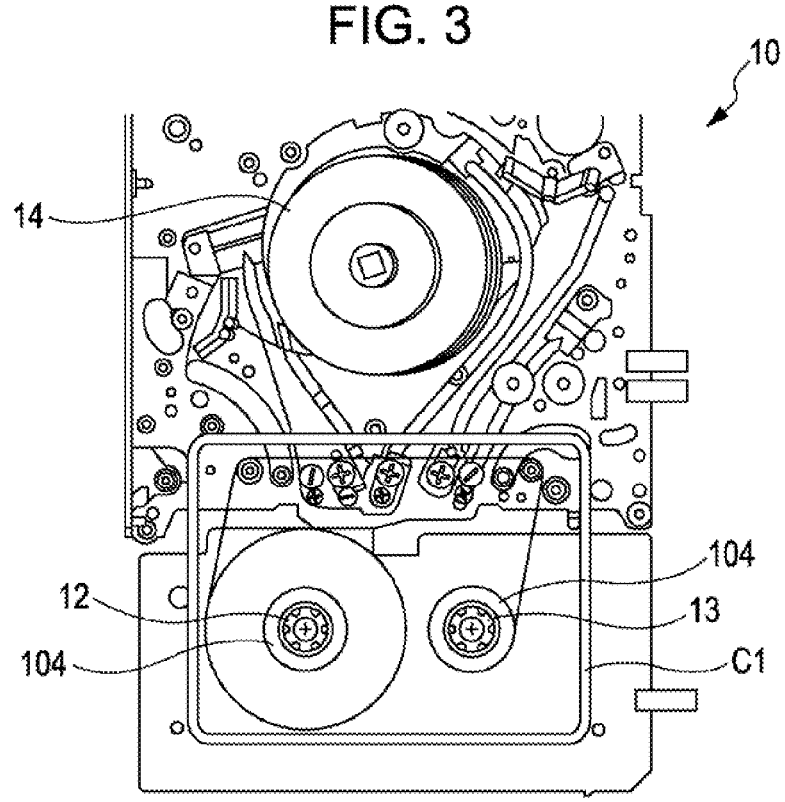
FIG. 3 shows a state in which the magnetic tape cartridge shown in FIG. 1 is mounted in a magnetic recording and reproducing apparatus according to the embodiment.
Figure 4:
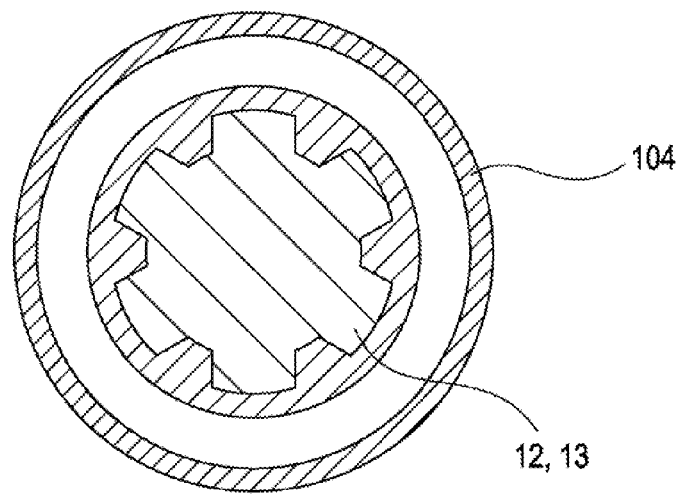
FIG. 4 is a top sectional view of a portion where a driving shaft and a hub are fitted with each other.
Figure 5:
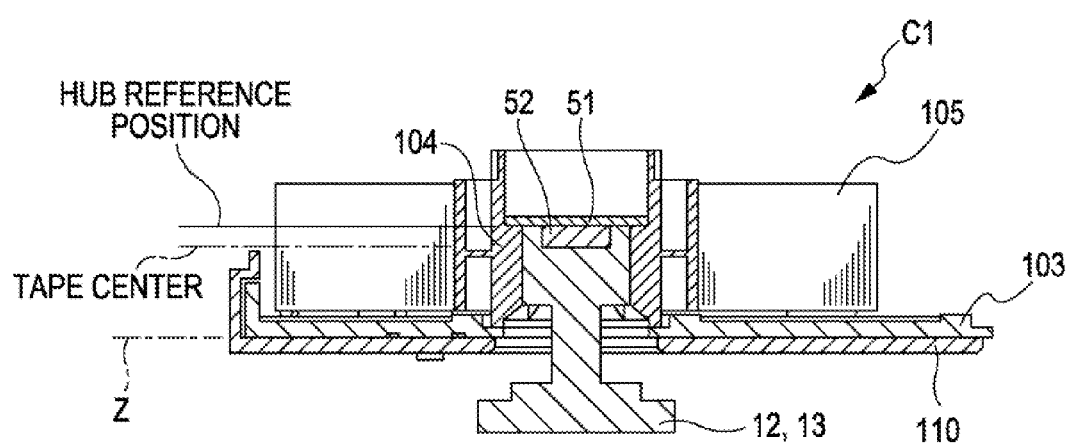
FIG. 5 is a cross-sectional view showing a state in which the hub of the magnetic tape cartridge shown in FIG. 1 is fitted on the driving shaft of the magnetic recording and reproducing apparatus.

FIG. 3 shows a state in which the magnetic tape cartridge C1 is mounted in the streamer 10. FIG. 4 is a sectional top view showing a fitting portion between a driving shaft 12 (13) of the streamer 10 and a hub 104 of the magnetic tape cartridge C1 in this state (in a mounting state). FIG. 5 shows a state in which the driving shaft 12 of the streamer 10 is fitted in the hub 104 of the magnetic tape cartridge C1 in the mounting state (a cross-sectional view taken along line V-V in FIG. 2).

Referring to FIG. 3, the driving shafts 12 and 13 stand on a housing base of the streamer 1 in which the tape cartridge C1 is inserted, and are rotatably supported at one end. In top portions of the other ends of the driving shafts 12 and 13 to be inserted in the hubs 104 of the tape cartridge C1, magnets are provided. A magnet is provided in at least one of the driving shafts, preferably, in a driving shaft for supplying (feeding) the magnetic tape.

As shown in FIG. 3, when the magnetic tape cartridge C1 is stored in the streamer 10, the leading ends of the driving shafts 12 and 13 are respectively fitted in inner diameter portions of the hubs 104 in the magnetic tape cartridge C1. More specifically, a gear having six projecting ribs is provided on the outer periphery of the leading end of the driving shaft 12, and this gear is meshed with a chucking gear provided in the inner diameter portion of the corresponding hub 104 when the driving shaft 12 is fitted in the hub 104 (FIG. 4). This allows the hub 104 to corotate with the driving shaft 12 or 13 without slipping as long as the rotation force is appropriate.

As shown in FIG. 5, the top portion of the driving shaft 12 is in tight contact with a height-position determining member 51 of the magnetic tape cartridge C1 so as to hold the hub 104 at a proper height position. Further, the driving shaft 12 regulates displacement of the hub 104 in the height direction by using the attraction force between the magnet 52 of the driving shaft 12 and the height-position determining member 51 formed by a magnetic member in the hub 104.

After the magnetic tape cartridge C1 is mounted in the streamer 10, a tape loading operation is performed. Since this operation is performed in a manner similar to that adopted in the related arts, a detailed description thereof will be omitted. With the rotation of the driving shaft 12, the hub 104 rotates, and the magnetic tape 105 is fed out and wound around a rotating drum device 14 through a predetermined running system. After recording or reproducing is performed, the magnetic tape 105 is taken up by the hub 104 corresponding to the driving shaft 13. In the present application, the hub 104 is held at a proper height position by the top portion of the driving shaft 12 because of the existence of the height-position determining member 51, and the displacement of the hub 104 in the height direction during rotation is regulated by the attraction force between the magnet 52 of the driving shaft 12 and the height-position determining member 51 formed by a magnetic member. Therefore, although the hub 104 does not have a flange, the height position of the magnetic tape 105 is fixed in the rotating drum device 14, and this allows precise recording and reproducing.

The magnetic tape cartridge according to the embodiment will be described in detail below with reference to examples.

First Example

In a first example, a height-position determining member 51 is provided near the center in the height direction of an inner diameter portion of a hub 104 in the magnetic tape cartridge C1 shown in FIG. 1. FIG. 2 is a general view of the magnetic tape cartridge C1. FIG. 5 is a vertical sectional view of the hub 104 in the magnetic tape cartridge C1, taken along line V-V in FIG. 2. FIG. 5 shows a state in which the hub 104 is fitted on a driving shaft 12 (13) in a magnetic recording and reproducing apparatus according to the embodiment.

As shown in FIG. 5, the hub 104 is molded integrally with a magnetic attraction SUS (ferritic stainless steel) plate serving as a height-position determining member 51. The SUS plate is provided at a position higher than the widthwise center of a magnetic tape 105, and is exposed in a contact portion (tight contact face) of the hub 104 with the driving shaft 12 fitted in the hub 104.

A height position where the height-position determining member 51 contacts the driving shaft 12 (the position serving as the reference of height determination in the hub 104 (hub reference position)) is provided 0.5 mm higher than the widthwise center (tape center) of the magnetic tape 105 (8 mm in width) wound around the hub 104, with respect to the cartridge reference height Z. That is, the height position is shifted upward from the widthwise center of the magnetic tape 105 by +6.3% of the width of the magnetic tape 105.

When the magnetic tape cartridge C1 of the first example is mounted in the magnetic recording and reproducing apparatus, the driving shaft 12 (13) is inserted in an inner diameter portion of the hub 104 in the magnetic tape cartridge C1, and a leading end portion (top portion) of the driving shaft 12 (13) comes into contact with and supports the height-position determining member 51. Consequently, the hub 104 in the magnetic tape cartridge C1 and the magnetic tape 105 are placed in predetermined height positions. A ferrite magnet serving as a magnet 52 is provided in the leading end portion (top portion) of the driving shaft 12 (13). By the force of the magnet 52 for attracting the SUS plate serving as the height-position determining member 51, the height-position determining member 51 and the driving shaft 12 (13) are held in tight contact with each other.

The following examinations were conducted on the magnetic tape cartridge C1 of the first example in this state.

(1) Tape Height Change

Figure 6A:
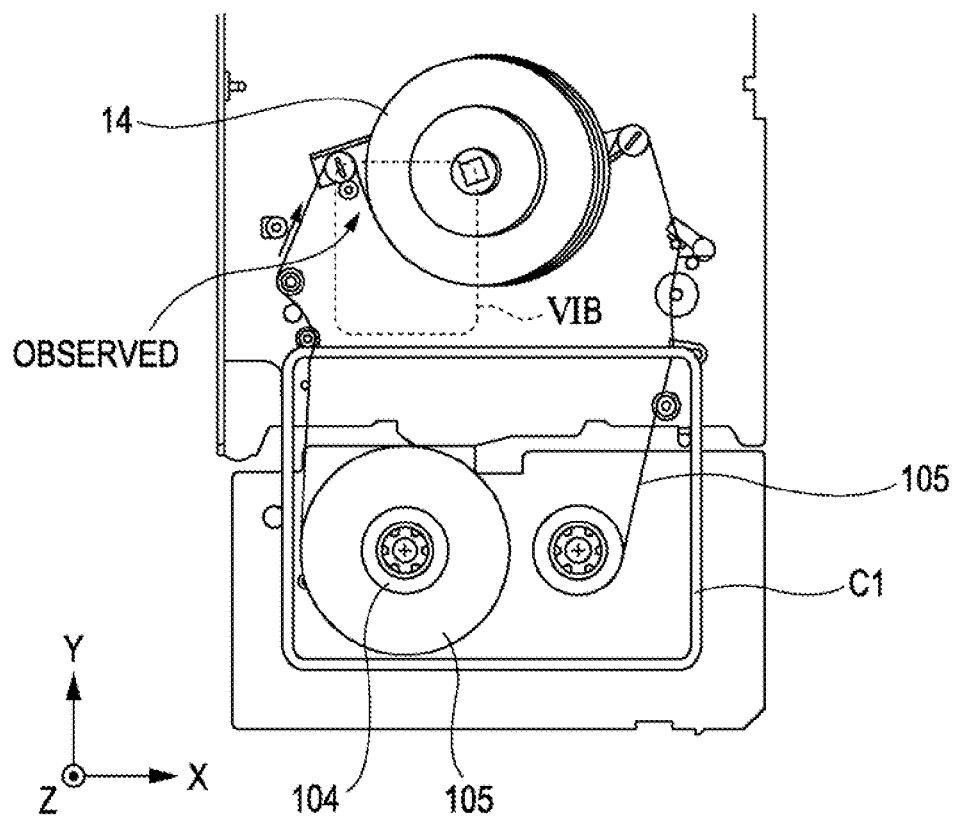
FIGS. 6A and 6B are observation views showing the change in height of a magnetic tape in a rotating drum device.
Figure 6B:
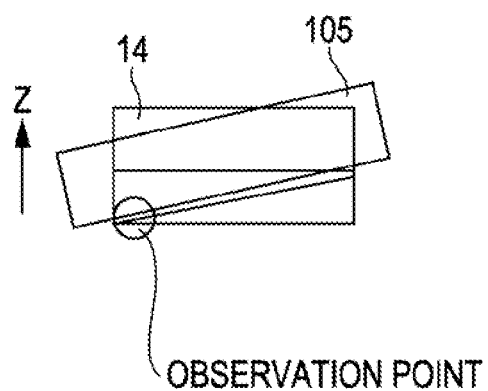

First, changes in the tape height at the entrance of the drum in the rotating drum device 14 of the magnetic recording and reproducing apparatus were evaluated. In the magnetic tape cartridge C1, the magnetic tape 105 was wound around the hub 104 to a winding diameter of 37 mm that was close to the largest winding diameter in DAT and DDS formats. While the magnetic tape 105 was caused to run by a tape length of 150 mm corresponding to the length in which the hub 104 with the magnetic tape 105 made at least one rotation, the height position of the magnetic tape 105 on the rotating drum device 14 was observed. More specifically, as shown in FIGS. 6A and 6B, the magnetic tape 105 fed forward from the supply-side hub 104 of the tape cartridge C1 passes through a guide in the magnetic recording and reproducing apparatus, and reaches the rotating drum device 14 on which a recording and reproducing head is mounted (FIG. 6A). Changes in the position of the magnetic tape 105 in the height direction Z (relative to X and Y directions) were observed at an observation point near the height position of a lower edge of the magnetic tape 105 at the entrance of the drum in the rotating drum device 14 in the defined area VIB shown in FIG. 6A (FIG. 6B). If the height of the magnetic tape 105 changes at this position in the rotating drum device 14, it is difficult to normally trace a track pattern recorded on the magnetic tape 105 by the recording and reproducing head mounted on the drum. Therefore, it is preferable that the positional relationship between the magnetic tape 105 and the rotating drum device 14 will not change in the height direction.

Measurement was taken with a laser displacement sensor LJ-G080 from Keyence Corporation. Since an optical path for directly applying laser light could not be ensured, laser light was guided by a mirror disposed near the observation point shown in FIG. 6B, and changes of the position in the height direction were observed. Herein, a tape height change 1 refers to a change in the height position of the magnetic tape measured when the magnetic recording and reproducing apparatus was installed so that the housing base was parallel to the floor (transversely installed), and a tape height change 2 refers to a change in the height position of the magnetic tape measured when the magnetic recording and reproducing apparatus was installed so that the housing base was vertical to the floor (vertically installed). That is, the positional relationship between the tape cartridge and the driving shafts of the drive is normally set so that the driving shafts are disposed on the lower side of the tape cartridge. In the case of a tape height change 1, the change in the height position of the tape is observed in a normal attitude. However, in an actual use, the tape cartridge and the driving shafts of the drive are sometimes parallel to each other, that is, the magnetic recording and reproducing apparatus is vertically installed. Therefore, the change in the height position at the entrance of the drum in this state was observed as a tape height change 2.

(2) Pulling Force

Next, the cartridge case 101 of the magnetic tape cartridge C1 was worked to form a slot at a position such that the center of the hub 104 in the magnetic tape cartridge C1 could be pulled from the outside through the slot. In a state in which the magnetic recording and reproducing apparatus in which the magnetic tape cartridge C1 was mounted is installed transversely, the force (pulling force) needed to lift the hub 104 from the driving shaft 12 through the slot from the outside was measured. As the pulling force, the maximum force acting until the hub 104 was pulled up from the stationary position to a height of 0.5 mm (denoted as "N/0.5 mm height") and the maximum force acting until the hub 104 was pulled up from the stationary position to a height of 0.1 mm (denoted as "N/0.1 mm height") were measured.

Second Example

A second example will now be described.

Figure 7A:
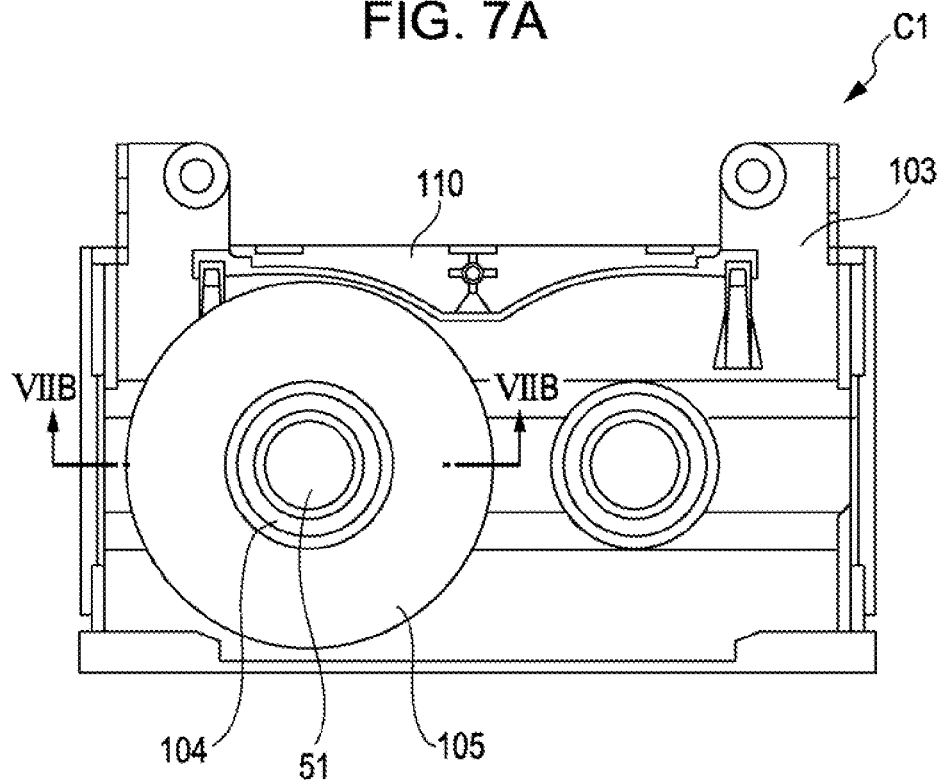
FIGS. 7A and 7B show a configuration of a second example.
Figure 7B:
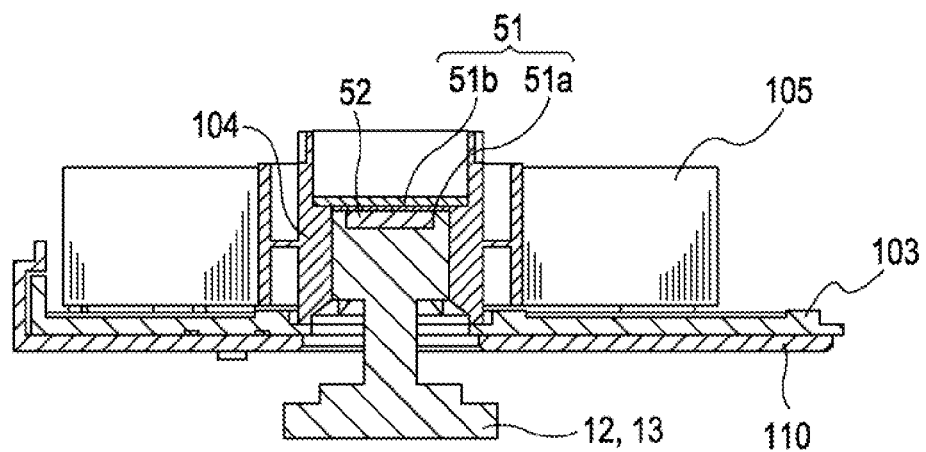

In the second example, a height-position determining member 51 is provided near the center of the inner diameter portion of the hub 104 in the height direction in the magnetic tape cartridge C1 shown in FIG. 1. FIG. 7A is a general view of a cartridge C1 of the second example. FIG. 7B is a vertical sectional view of a hub 104 in the tape cartridge C1, taken along line VIIB-VIIB in FIG. 7A, and shows a state in which the hub 104 is fitted on the driving shaft 12 (13) of the magnetic recording and reproducing apparatus.

The hub 104 shown in FIG. 7B is molded integrally with a height-position determining member 51 that includes an attraction SUS (ferritic stainless steel) plate serving as a magnetic member. The height-position determining member 51 is provided above the widthwise center of a magnetic tape 105. More specifically, the height-position determining member 51 includes a partition member 51a that partitions an inner diameter portion of the hub 104 at a predetermined height position and that is formed of the same material as that of the body of the hub 104. The height-position determining member 51 also includes an SUS plate 51b provided on the partition member 51a. The SUS plate 51b is not exposed from a contact portion (tight contact face) between the hub 104 and the driving shaft 12 to be fitted.

A height position where the height-position determining member 51 contacts the driving shaft 12 (the position serving as the reference of height determination in the hub 104 (hub reference position)) is 1.0 mm higher than the widthwise center (tape center) of the magnetic tape 105 (8 mm in width) wound around the hub 104, with respect to the cartridge reference height Z. That is, the height position is shifted up from the widthwise center of the magnetic tape 105 by +12.5% of the width of the magnetic tape 105.

When the magnetic tape cartridge C1 in the second example is mounted in the magnetic recording and reproducing apparatus, similarly to the first example, the leading end (top portion) of the driving shaft 12 (13) contacts and supports the partition member 51*a* of the height-position determining member 51, and the height-position determining member 51 and the driving shaft 12 (13) are held in tight contact with each other by the force of the magnet 52 in the driving shaft 12 (13) for attracting the SUS plate 51*b* in the height-position determining member 51. The SUS plate 51*b* is not in direct contact with the driving shaft 12 (13).

Investigations similar to those for the first example were made on the magnetic tape cartridge C1 of the second example in this state.

Third Example

A third example will now be described.

Figure 8A:
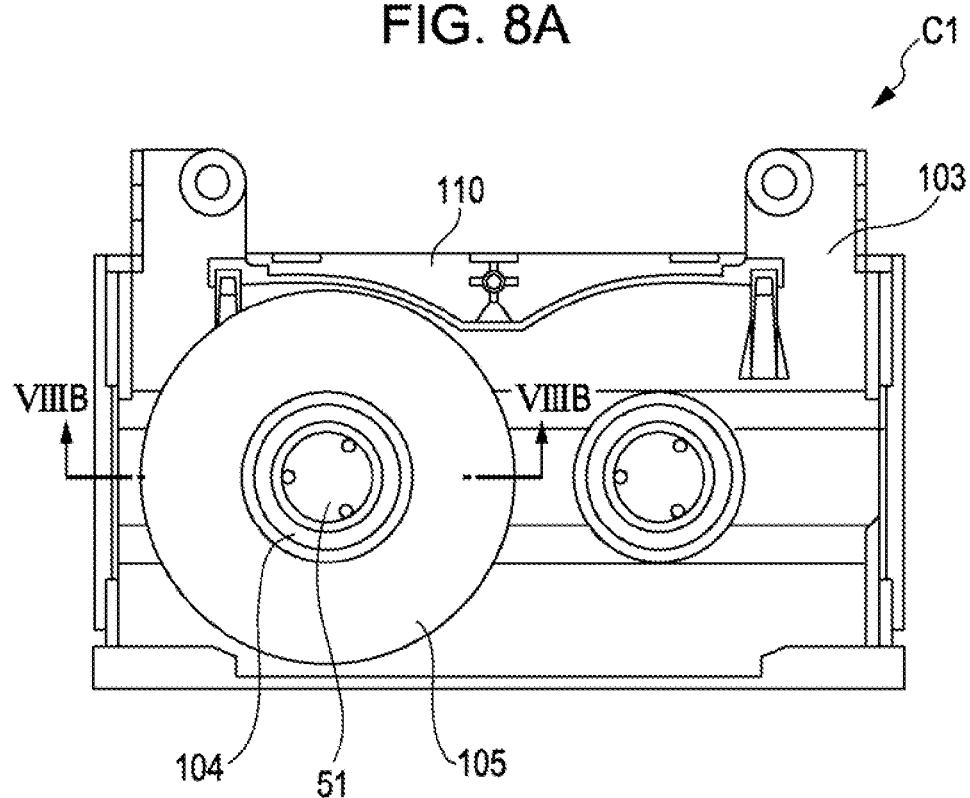
FIGS. 8A and 8B show a configuration of a third example.
Figure 8B:
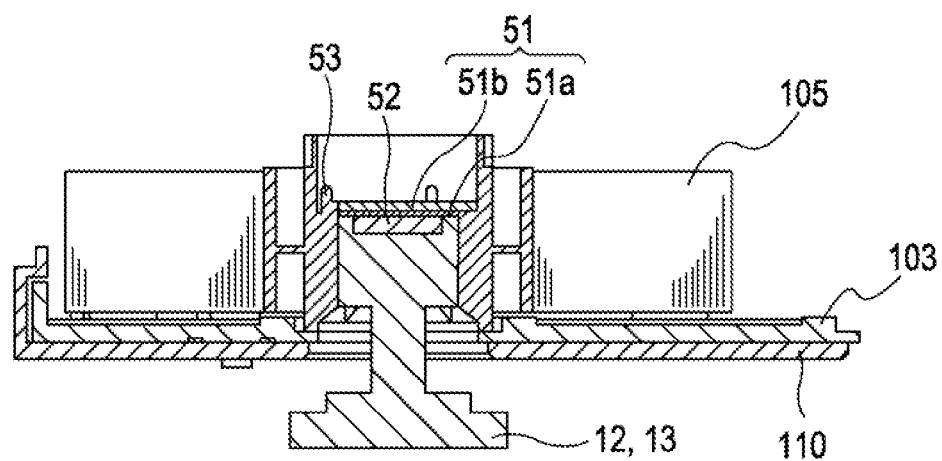

In the third example, a height-position determining member 51 is provided near the center of the inner diameter portion of the hub 104 in the height direction in the magnetic tape cartridge C1 shown in FIG. 1. FIG. 8A is a general view of a cartridge C1 according to the third example. FIG. 8B is a vertical sectional view of a hub 104 in the tape cartridge C1, taken along line VIIIB-VIIIB in FIG. 8A, and shows a state in which the hub 104 is fitted on the driving shaft 12 (13) of the magnetic recording and reproducing apparatus.

The hub 104 shown in FIG. 8B is provided with a height-position determining member 51 including an attraction SUS (ferritic stainless steel) plate serving as a magnetic member. The height-position determining member 51 is provided above the widthwise center of a magnetic tape 105. More specifically, the height-position determining member 51 includes a partition member 51*a* that partitions an inner diameter portion of the hub 104 at a predetermined height position and that is formed of the same material as that of the body of the hub 104. The height-position determining member 51 also includes an SUS plate 51*b* fixed to the partition member 51*a* by a caulk 53. The SUS plate 51*b* is not exposed in a contact portion (tight contact face) between the hub 104 and the driving shaft 12 to be fitted.

A height position where the height-position determining member 51 contacts the driving shaft 12 (the position serving as the reference of height determination in the hub 104 (hub reference position)) is 1.5 mm higher than the widthwise center (tape center) of the magnetic tape 105 (8 mm in width) wound around the hub 104, with respect to the cartridge reference height Z. That is, the height position is shifted up from the widthwise center of the magnetic tape 105 by +18.8% of the width of the magnetic tape 105.

When the magnetic tape cartridge C1 of the third example is mounted in the magnetic recording and reproducing apparatus, similarly to the first example, the leading end portion (top portion) of the driving shaft 12 (13) contacts and supports the partition member 51*a* of the height-position determining member 51, and the height-position determining member 51 and the driving shaft 12 (13) are held in tight contact with each other by the force of the magnet 52 in the driving shaft 12 (13) for attracting the SUS plate 51*b* in the height-position determining member 51. The SUS plate 51*b* is not in direct contact with the driving shaft 12 (13).

Investigations similar to those for the first example were made on the magnetic tape cartridge C1 of the third example in this state.

Fourth Example

A fourth example will now be described.

Figure 9A:
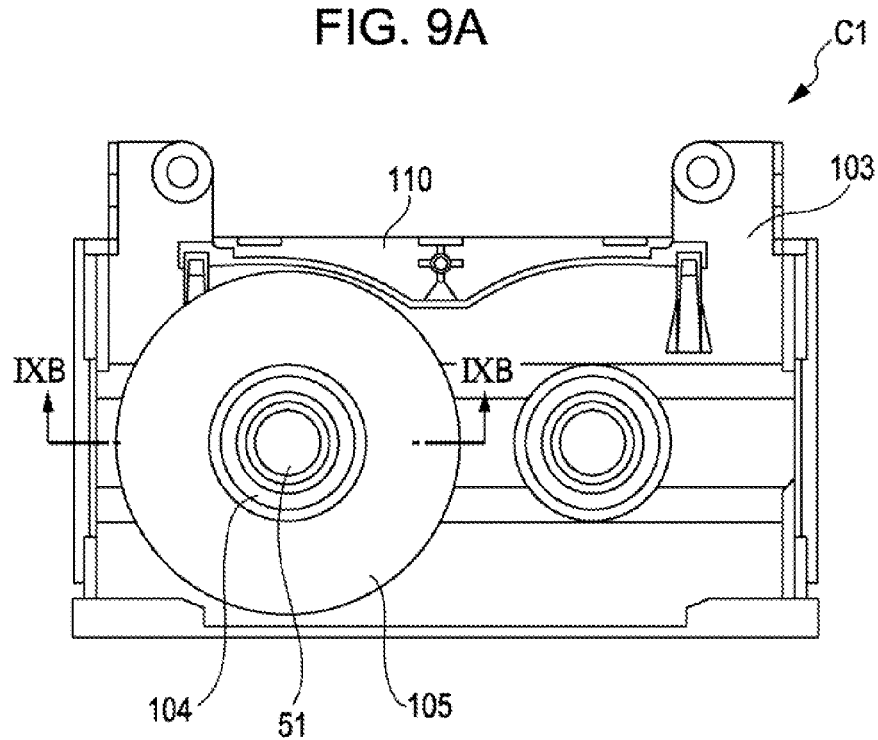
FIGS. 9A and 9B show a configuration of a fourth example.
Figure 9B:
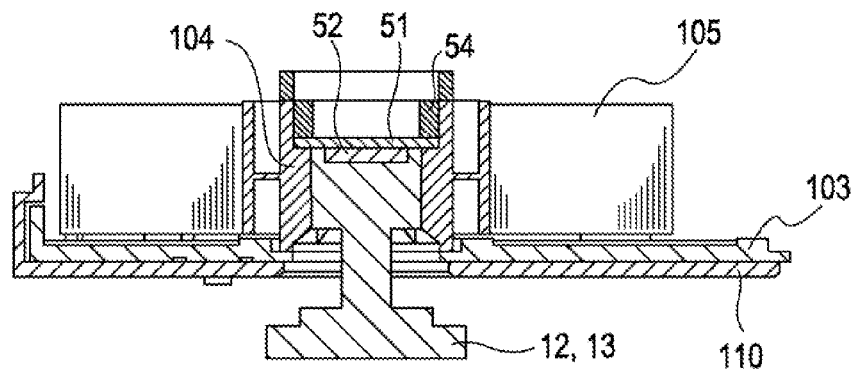

In the fourth example, a height-position determining member 51 is provided near the center of the inner diameter portion of the hub 104 in the height direction in the magnetic tape cartridge C1 shown in FIG. 1. FIG. 9A is a general view of a cartridge C1 according to the fourth example. FIG. 9B is a vertical sectional view of a hub 104 in the tape cartridge C1, taken along line IXB-IXB in FIG. 9A, and shows a state in which the hub 104 is fitted on the driving shaft 12 (13) of the magnetic recording and reproducing apparatus.

In the hub 104 shown in FIG. 9B, an attraction SUS (ferritic stainless steel) plate formed by a magnetic member is provided as a height-position determining member 51. The height-position determining member 51 is provided above the widthwise center of a magnetic tape 105, and is fixed to a main body of the hub 104 by a separate component 54. The SUS plate is exposed from a contact portion (tight contact face) between the hub 104 and the driving shaft 12 to be fitted.

A height position where the height-position determining member 51 contacts the driving shaft 12 (the position serving as the reference of height determination in the hub 104 (hub reference position)) is 0.5 mm higher than the widthwise center (tape center) of the magnetic tape 105 (8 mm in width) wound around the hub 104, with respect to the cartridge reference height Z. That is, the height position is shifted up from the widthwise center of the magnetic tape 105 by +6.3% of the width of the magnetic tape 105.

When the magnetic tape cartridge C1 of the fourth example is mounted in the magnetic recording and reproducing apparatus, similarly to the first example, the leading end portion (top portion) of the driving shaft 12 (13) contacts and supports the height-position determining member 51, and the SUS plate of the height-position determining member 51 and the driving shaft 12 (13) are held in direct and tight contact with each other by the force of the magnet 52 in the driving shaft 12 (13) for attracting the SUS plate 51*b* serving as the height-position determining member 51.

Investigations similar to those for the first example were made on the magnetic tape cartridge C1 of the fourth example in this state.

Fifth Example

A fifth example will now be described.

Figure 10A:
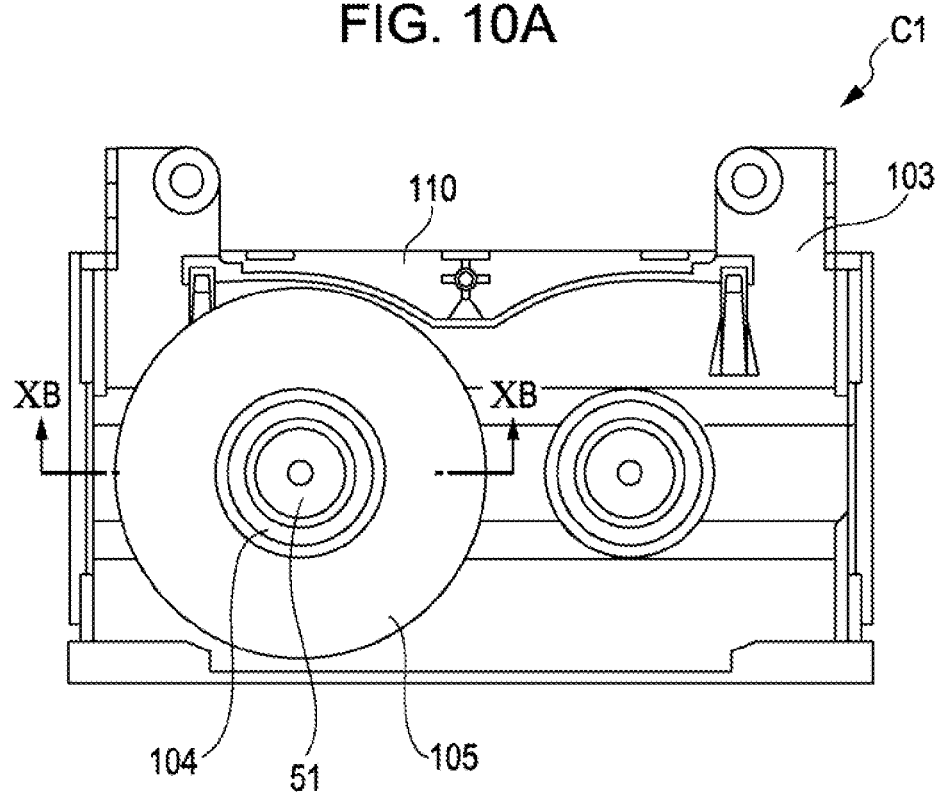
FIGS. 10A and 10B show a configuration of a fifth example.
Figure 10B:
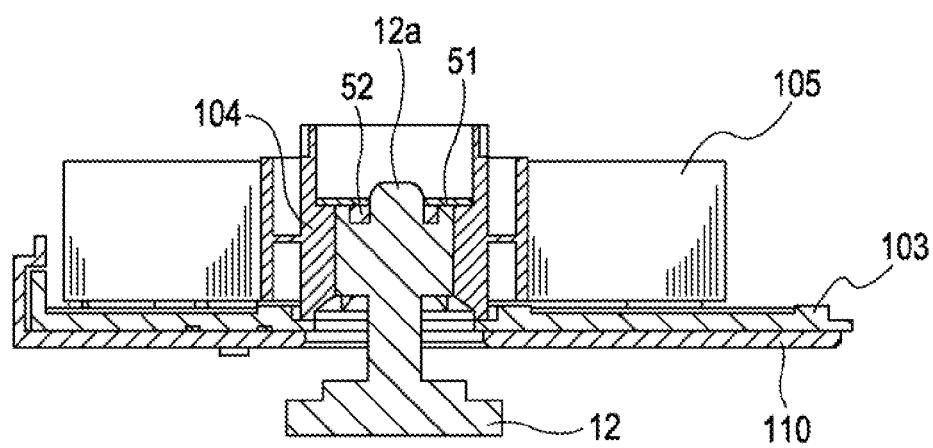

In the fifth example, a height-position determining member 51 is provided near the center of the inner diameter portion of the hub 104 in the height direction in the magnetic tape cartridge C1 shown in FIG. 1. FIG. 10A is a general view of a cartridge C1 according to the fifth example. FIG. 10B is a vertical sectional view of a hub 104 in the tape cartridge C1, taken along line XB-XB in FIG. 10A, and shows a state in which the hub 104 is fitted on the driving shaft 12 (13) of the magnetic recording and reproducing apparatus.

In the hub 104 shown in FIG. 10B, an attraction SUS (ferritic stainless steel) plate formed by a magnetic member is provided as a height-position determining member 51. The height-position determining member 51 is provided above the widthwise center of a magnetic tape 105. The SUS plate is exposed from a contact portion (tight contact face) between the hub 104 and the driving shaft 12 to be fitted. The height-position determining member 51 has a through hole corresponding to the center of an inner diameter portion of the hub 104.

A height position where the height-position determining member 51 contacts the driving shaft 12 (the position serving as the reference of height determination in the hub 104 (hub reference position)) is 1.0 mm higher than the widthwise center (tape center) of the magnetic tape 105 (8 mm in width) wound around the hub 104, with respect to the cartridge reference height Z. That is, the height position is shifted up from the widthwise center of the magnetic tape 105 by +12.5% of the width of the magnetic tape 105.

In the fifth example, a projection 12a is provided at the top portion of the driving shaft 12 in the magnetic recording and reproducing apparatus, and is surrounded by a ring-shaped magnet 52.

When the magnetic tape cartridge C1 of the fifth example is mounted in the magnetic recording and reproducing apparatus, first, the projection 12a at the top portion of the driving shaft 12 (13) is inserted in the through hole of the height-position determining member 51. Then, the top portion of the driving shaft 12 (13) contacts and supports the height-position determining member 51. The SUS plate of the height-position determining member 51 and the driving shaft 12 (13) are held in direct and tight contact with each other by the force of the magnet 52 in the driving shaft 12 (13) for attracting the SUS plate 51b.

Investigations similar to those for the first example were made on the magnetic tape cartridge C1 of the fifth example in this state.

Sixth Example

A sixth example will now be described.

Figure 11A:
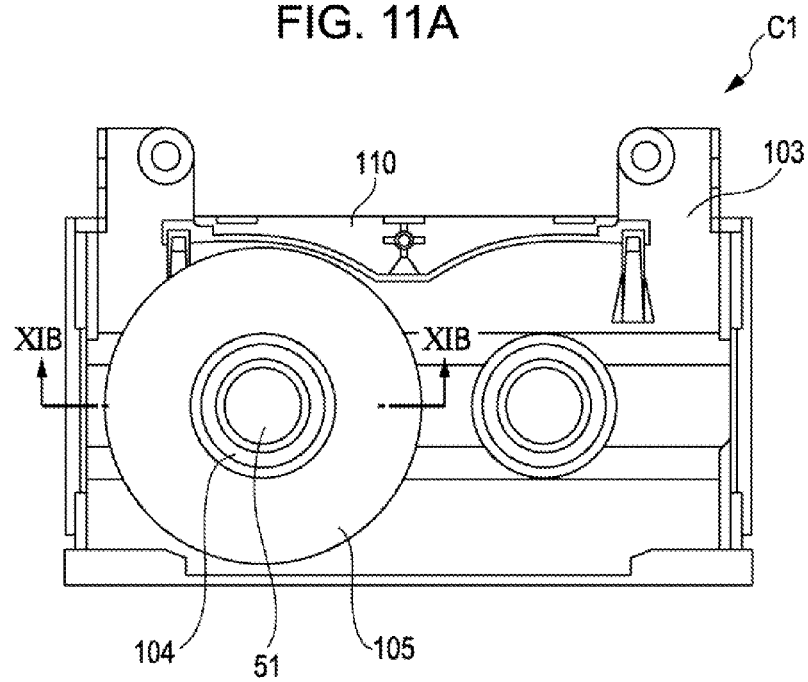
FIGS. 11A and 11B show a configuration of a sixth example.
Figure 11B:
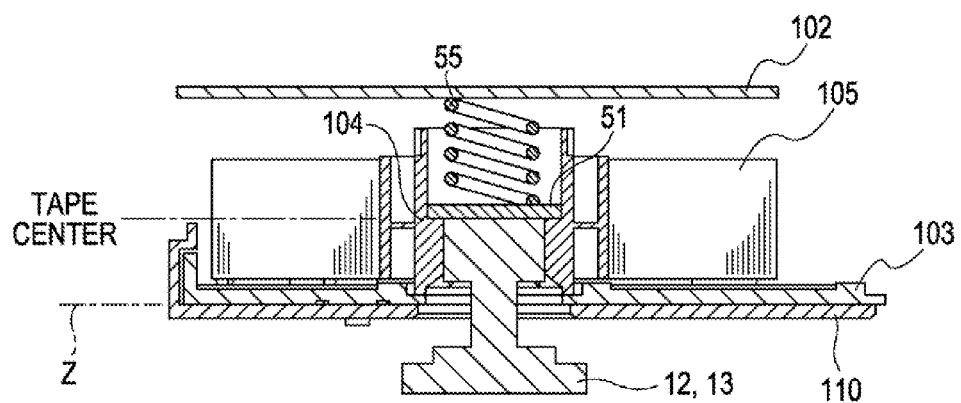

In the sixth example, a height-position determining member 51 and an elastic member 55 for pressing the height-position determining member 51 are provided near the center of the inner diameter portion of the hub 104 in the height direction in the magnetic tape cartridge C1 shown in FIG. 1. FIG. 11A is a general view of a cartridge C1 according to the sixth example. FIG. 11B is a vertical sectional view of a hub 104 in the tape cartridge C1, taken along line XIB-XIB in FIG. 11A, and shows a state in which the hub 104 is fitted on the driving shaft 12 (13) of the magnetic recording and reproducing apparatus.

In the hub 104 shown in FIG. 11B, the height-position determining member 51 is provided above the widthwise center of a magnetic tape 105. The elastic member 55 serving as a spring component is fixed to an upper shell 102 that forms a cartridge case 101, and is disposed so as to press the height-position determining member 51 toward a lower shell 103.

A height position where the height-position determining member 51 contacts the driving shaft 12 (the position serving as the reference of height determination in the hub 104 (hub reference position)) is 0.5 mm higher than the widthwise center (tape center) of the magnetic tape 105 (8 mm in width) wound around the hub 104, with respect to the cartridge reference height Z. That is, the height position is shifted up from the widthwise center of the magnetic tape 105 by +6.3% of the width of the magnetic tape 105.

When the magnetic tape cartridge C1 of the sixth example is mounted in the magnetic recording and reproducing apparatus, the driving shaft 12 (13) is inserted in an inner diameter portion of the hub 104 in the magnetic tape cartridge C1, and the leading end portion (top portion) of the driving shaft 12 (13) contacts and supports the height-position determining member 51. Consequently, the hub 104 and the magnetic tape 105 are placed at predetermined height positions in the magnetic tape cartridge C1. Since the elastic member 55 presses the height-position determining member 51 downward in the figure, the height-position determining member 51 and the driving shaft 12 (13) are held in tight contact with each other.

Investigations similar to those for the first example were made on the magnetic tape cartridge C1 of the sixth example in this state.

Seventh Example

A seventh example will now be described.

Figure 12A:
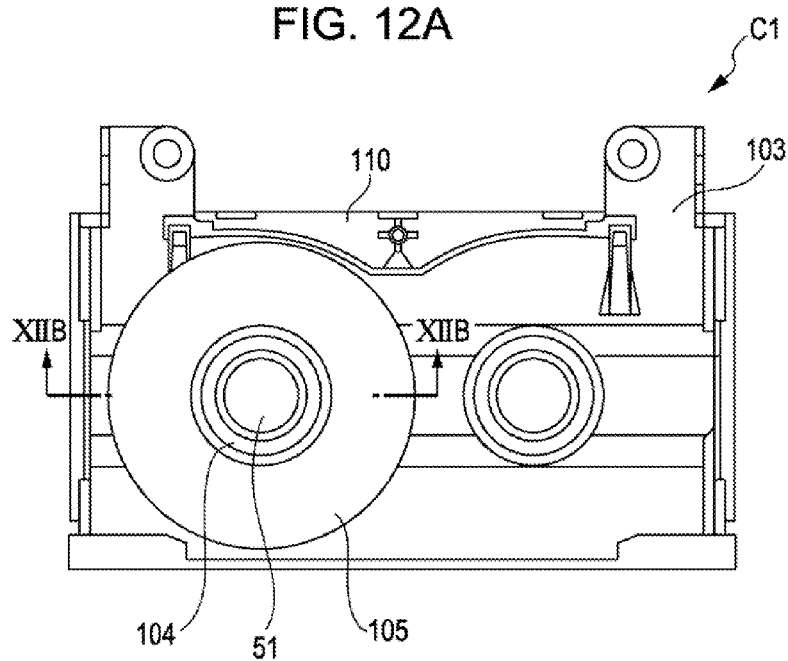
FIGS. 12A and 12B show a configuration of a seventh example.
Figure 12B:
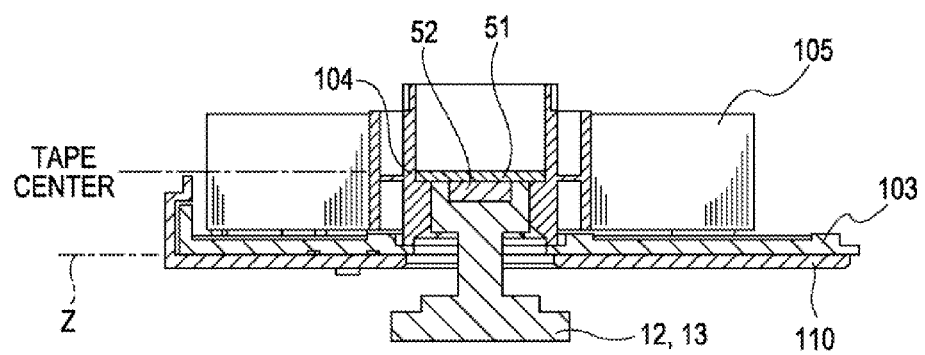

In the seventh example, a height-position determining member 51 is provided lower than the center of the inner diameter portion of the hub 104 in the height direction in the magnetic tape cartridge C1 shown in FIG. 1. FIG. 12A is a general view of a cartridge C1 according to the seventh example. FIG. 12B is a vertical sectional view of a hub 104 in the tape cartridge C1, taken along line XIIB-XIIB in FIG. 12A, and shows a state in which the hub 104 is fitted on the driving shaft 12 (13) of the magnetic recording and reproducing apparatus.

The hub 104 shown in FIG. 12B is molded integrally with an attraction SUS (ferritic stainless steel) plate formed by a magnetic member and serving as the height-position determining member 51. The height-position determining member 51 is provided lower than the widthwise center of a magnetic tape 105. The SUS plate is exposed from a contact portion (tight contact face) between the hub 104 and the driving shaft 12 to be fitted.

A height position where the height-position determining member 51 contacts the driving shaft 12 (the position serving as the reference of height determination in the hub 104 (hub reference position)) is 0.5 mm lower than the widthwise center (tape center) of the magnetic tape 105 (8 mm in width) wound around the hub 104, with respect to the cartridge reference height Z. That is, the height position is shifted down from the widthwise center of the magnetic tape 105 by 6.3% of the width of the magnetic tape 105 (that is, −6.3%).

When the magnetic tape cartridge C1 of the seventh example is mounted in the magnetic recording and reproducing apparatus, similarly to the first example, the leading end portion (top portion) of the driving shaft 12 (13) contacts and supports a partition member 51a in the height-position determining member 51, and the height-position determining member 51 and the driving shaft 12 (13) are held in tight contact with each other by the force of the magnet 52 in the driving shaft 12 (13) for attracting the SUS plate serving as the height-position determining member 51.

Investigations similar to those for the first example were made on the magnetic tape cartridge C1 of the seventh example in this state.

First Comparative Example

A first comparative example will now be described.

Figure 13A:
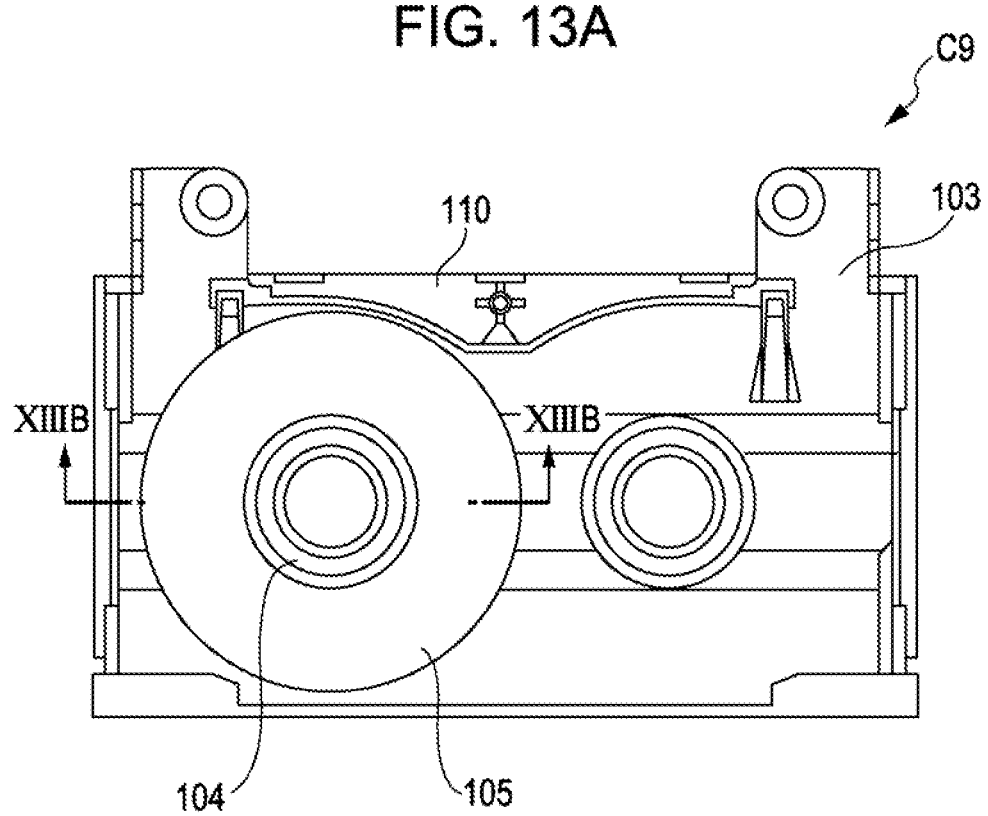
FIGS. 13A and 13B show a configuration of a first comparative example.
Figure 13B:
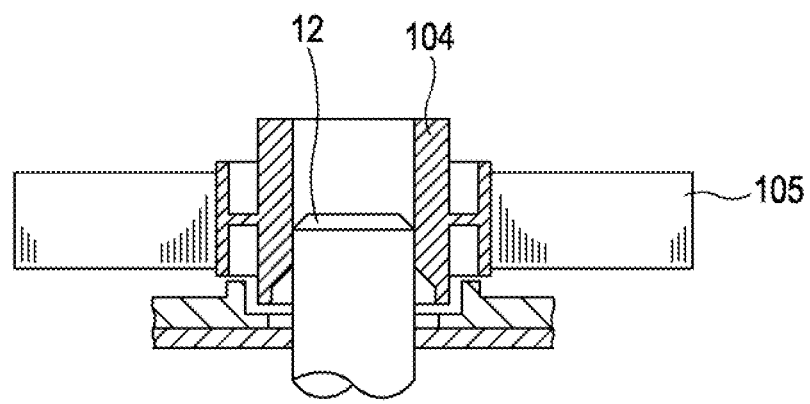

A magnetic tape cartridge C9 of the first comparative example has the structure of the related art (does not have a height-position determining member). FIG. 13A is a general view of the cartridge C9 of the first comparative example. FIG. 13B is a vertical sectional view of a hub 104 in the tape cartridge C9, taken along line XIIIB-XIIIB in FIG. 13A, and shows a state in which the hub 104 is fitted on the driving shaft 12 (13) of the magnetic recording and reproducing apparatus.

In the first comparative example, the hub 104 in the tape cartridge C9 does not have a height-position determining member. When the tape cartridge C9 is mounted in the magnetic recording and reproducing apparatus, the height of the hub 104 is not regulated by the driving shaft 12, and the height of a tape 105 in the cartridge C9 is determined only by the lower reference height Z of the cartridge shell, the cartridge lower shell 103 shown in FIG. 1, and a sheet laid on the lower shell 103.

Investigations similar to those for the first example were conducted on the magnetic tape cartridge C9 of the first comparative example in this state.

Table 1 shows the results of investigations described above.

TABLE 1

|  | First Example | Second Example | Third Example | Fourth Example | Fifth Example | Sixth Example | Seventh Example | First Comparative Example |
|---|---|---|---|---|---|---|---|---|
| Tape Height Change 1 ($\mu$m) | ≤5 | ≤5 | ≤5 | ≤5 | ≤5 | ≤5 | 7 | 10 |
| Tape Height Change 2 ($\mu$m) | ≤5 | ≤5 | ≤5 | ≤5 | ≤5 | ≤5 | 12 | 45 |
| Pulling Force (N/0.5 mm height) | 0.30 | 0.23 | 0.28 | 0.32 | 0.25 | 0.70 | 0.29 | 0.11 |
| Pulling Force (N/0.1 mm height) | 0.30 | 0.23 | 0.28 | 0.32 | 0.25 | 0.19 | 0.29 | 0.11 |
| Cartridge Compatibility | Compatible | Compatible | Compatible | Compatible | Compatible | Compatible | Compatible | Compatible |

(1) Tape Height Change

Tape Height Change 1

The height change near the entrance of the drum could be limited to 5 $\mu$m or less in the first to sixth examples. This value is sufficiently practical because tracking mismatch can be avoided in formats having a track width of 5 $\mu$m or less, and the advantages can be achieved. In an azimuth recording method commonly used for a format using helical scanning, the system can work as long as the track change is about three times the track width or less. Since this value is a comprehensive value set in consideration not only of the tape height change near the entrance of the drum, but also of off-track, etc., it is preferable to minimize the tape height change at the entrance of the drum.

In the seventh example, the tape height change 1 is increased to 7 $\mu$m. In this case, it is difficult to build a system while providing compensation for tracking mismatch in a format having a track pitch of 5 $\mu$m or less. Compared with the first to sixth examples, the seventh example is not absolutely useless, but the design tolerance is decreased.

In the first comparative example, the tape height change 1 reaches 10 $\mu$m. Therefore, it is seriously difficult to use this example in a format having a track pitch of 5 $\mu$m or less.

Tape Height Change 2

In the first to sixth examples, the height change at the entrance of the drum is 5 $\mu$m or less even when the attitude changes. This value is sufficiently practical because tracking mismatch can be avoided in formats having a track width of 5 $\mu$m or less, and the advantages can be achieved.

While the seventh example is better than the first comparative example, the height change at the entrance of the drum is 12 $\mu$m. In this case, it is difficult to build a system while providing compensation for tracking mismatch in a format having a track pitch of 5 $\mu$m or less. Compared with the first to sixth examples, the seventh example is not absolutely useless, but the design tolerance is decreased.

The height change at the entrance of the drum reaches 45 $\mu$m in the first comparative example. Therefore, it is substantially impossible to apply this example to a format having a track pitch of 5 $\mu$m or less.

(2) Pulling Force

Since the attraction force of the magnet is utilized in the first to fifth and seventh examples, the hub in the tape cassette can be lifted only by a force that is much greater than the total weight of 8 g of the hub and the magnetic tape wound around the hub. When the magnet is used, the maximum acting force is substantially fixed, regardless of the lifting height, and the pulling force needs to increase as the distance to the driving shaft in the magnetic recording and reproducing apparatus decreases.

In the sixth example, the maximum force is larger when lifting the hub by 0.5 mm. The pulling force decreases as the distance to the driving shaft decreases.

On the analogy of the above results, it is revealed that the force for regulating the height can be stably obtained by using a combination of the magnet and the spring, regardless of the distance between the height-position determining member and the leading end portion (head portion) of the driving shaft. For this reason, it is more preferable to use both a magnet and a spring as the mechanism for regulating the height.

In actuality, however, the cost is increased by using both the magnet and the spring. Even when one of the magnet and the spring is used, sufficient effects can be obtained. Therefore, it is not always necessary to use both the magnet and the spring.

In contrast, the first comparative example does not adopt a member for regulating the height. Therefore, the force needed to lift the hub is only about 0.11 N (newton) corresponding to the sum of the total weight of the hub and the magnetic tape and the frictional force that seems static frictional force in the initial motion. It seems that the tape height change 2 is larger than the tape height change 1 for this reason.

For new generation magnetic recording and reproducing apparatuses, it is an absolute condition to use earlier generation magnetic tape cartridges. Accordingly, verification of compatibility was conducted. That is, it was verified whether an earlier generation magnetic tape cartridge that was produced by the technique as the related art could be compatibly used in the magnetic recording and reproducing apparatuses adopted in the examples (the magnetic recording and reproducing apparatus according to the embodiment).

Figure 14:
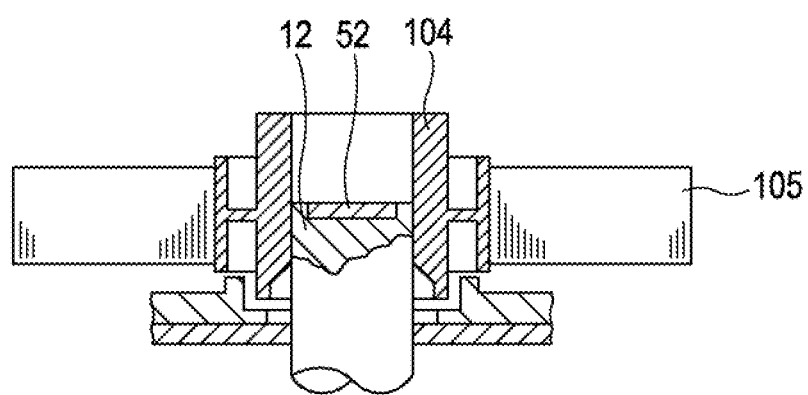
FIG. 14 shows a structure in which a driving shaft of a magnetic recording and reproducing apparatus in the first example is combined with a hub of a magnetic tape cartridge in the first comparative example.

More specifically, it was verified whether the magnetic tape cartridge C9 adopted in the first comparative example could be mounted in the magnetic recording and reproducing apparatuses as the first to seventh examples and the first comparative example. By way of example, FIG. 14 shows a combination of the driving shaft 12 of the magnetic recording and reproducing apparatus used in the first example and the hub 104 of the magnetic tape cartridge C9 as the first comparative example.

The results of verification are shown as cartridge compatibility in Table 1.

In the magnetic tape cartridge C9 of the first comparative example, a through hole extends to an upper end of the inner diameter portion of the hub 104. Therefore, there is no limitation when the hub 104 is combined with the driving shafts in the magnetic recording and reproducing apparatuses of the first to seventh examples. Even when the magnetic tape cartridge C9 corresponding to the earlier generation cartridge is mounted, no problem occurs during mounting and tape loading, and high compatibility can be ensured. Of course, there is no problem even when the driving shaft of the first comparative example and the magnetic tape cartridge of the first comparative example are combined.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A magnetic tape cartridge comprising:
a cartridge case;
a pair of cylindrical hubs rotatably provided in the cartridge case; and
a magnetic tape laid between the hubs and wound around outer peripheries of the hubs,
wherein each of the hubs has an inner diameter portion provided with a height-position determining member, the height-position determining member determines a height position of the hub in the magnetic tape cartridge by contacting an inserted portion of a driving shaft inserted in the hub when the magnetic tape cartridge is mounted in a magnetic recording and reproducing apparatus, and the height-position determining member includes a magnetic member that has a flat face without a downward extending flange, the flat face exposed in a contact portion of the magnetic member, the contact portion extending substantially across a full width of the inserted portion of the driving shaft, to make tight contact with substantially the full width of the inserted portion of the driving shaft such that the inserted portion of the driving shaft structurally affects the magnetic tape cartridge by regulating displacement of the height-position determining member upon said tight contact with the flat face of the magnetic member.

2. The magnetic tape cartridge according to claim 1, wherein the height-position determining member is formed by a magnetic member or is integrated with a magnetic member.

3. The magnetic tape cartridge according to claim 1, further comprising:
an elastic member configured to contact the height-position determining member so as to press the hub toward the driving shaft.

4. The magnetic tape cartridge according to claim 1, wherein a position where the height-position determining member contacts the driving shaft corresponds to or is higher than a widthwise center of the magnetic tape wound around the hub.

5. The magnetic tape cartridge according to claim 1, wherein the height-position determining member is integrated with the hub.

6. The magnetic tape cartridge according to claim 1, wherein the height-position determining member is located in the inner diameter of the hub at a widthwise center of the magnetic tape.

7. The magnetic tape cartridge according to claim 1, wherein the height-position determining member is located in the inner diameter of the hub above a widthwise center of the magnetic tape.

8. A magnetic recording and reproducing apparatus comprising:
one rotating drum device having a rotating head;
a pair of driving shafts rotatably supported at one end; and
a magnetic tape cartridge mounted in the magnetic recording and reproducing apparatus, wherein the magnetic tape cartridge includes:
a cartridge case;
a pair of cylindrical hubs rotatably provided in the cartridge case; and
a magnetic tape laid between the hubs and wound around outer peripheries of the hubs,
wherein each of the hubs has an inner diameter portion provided with a height-position determining member, and the height-position determining member determines a height position of the hub in the magnetic tape cartridge by contacting an inserted portion of a driving shaft of the pair of driving shafts inserted in the hub;
wherein the height-position determining member is formed by or includes a magnetic member that has a flat face without a downward extending flange, the flat face exposed in a contact portion of the magnetic member, the contact portion extending substantially across a full width of the inserted portion of the driving shaft, to make tight contact with substantially the full width of the inserted portion of the driving shaft such that the inserted portion of the driving shaft structurally affects the magnetic tape cartridge by regulating displacement of the height-position determining member upon said tight contact with the flat face of the magnetic member; and
wherein at least one of the driving shafts has a magnet in a portion in contact with the height-position determining member in the magnetic tape cartridge.

* * * * *